(No Model.)

G. W. STINEBRING.
ADJUSTABLE SAW TOOTH.

No. 299,291. Patented May 27, 1884.

WITNESSES
Martin Toulmin
Edwin L Bradford

INVENTOR
George W. Stinebring
A. W. Morgan
Attorney

UNITED STATES PATENT OFFICE.

GEORGE W. STINEBRING, OF SHREVE, OHIO.

ADJUSTABLE SAW-TOOTH.

SPECIFICATION forming part of Letters Patent No. 299,291, dated May 27, 1884.

Application filed November 28, 1883. (No model.)

*To all whom it may concern:*

Be it known that I, GEORGE W. STINEBRING, a citizen of the United States, residing at Shreve, in the county of Wayne and State of Ohio, have made certain new and useful Improvements in Saws, of which the following is a specification.

This invention relates to new and useful improvements in saw-teeth, and has for its object to provide a tooth to a saw-blade which may be easily removed or inserted and adjusted as it is worn by use, and be firmly held in its place. These objects are attained by the devices illustrated in the accompanying drawings, forming a part of this specification, in which—

Figure 1:
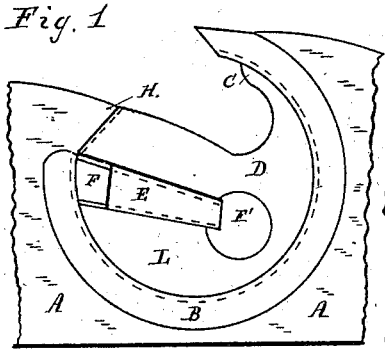
Figure 2:
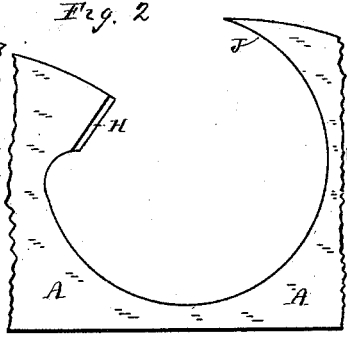
Figure 3:
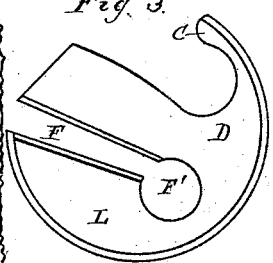
Figure 4:
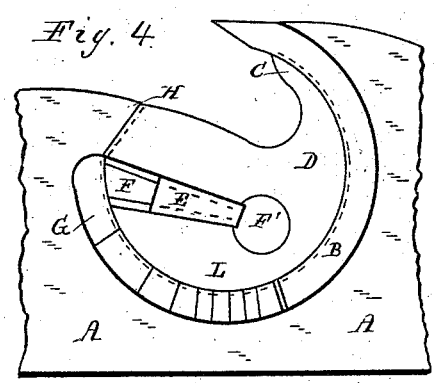
Figure 5:
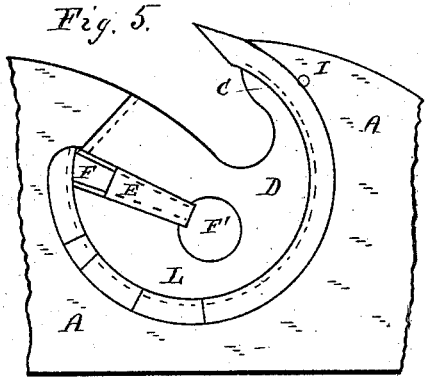
Figure 6:
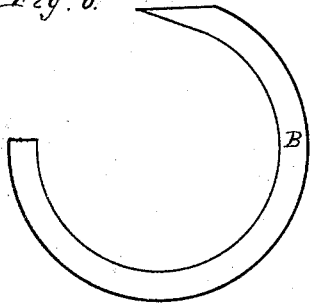
Figure 7:
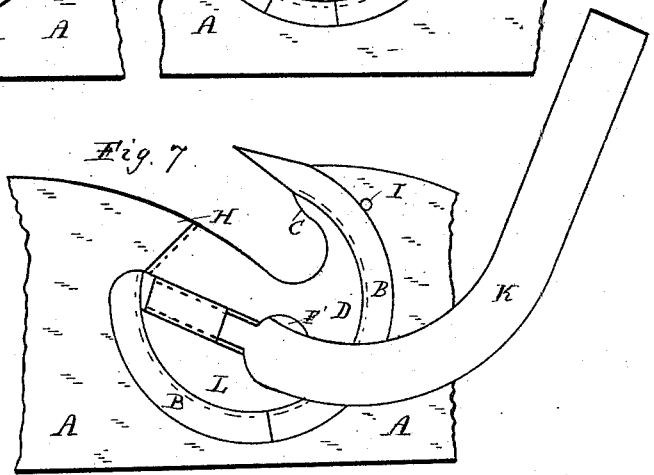
Figure 8:
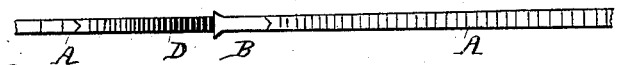

Figure 1 is a side elevation of a part of a saw-blade, and shows one of my improved saw-teeth secured in its place. Fig. 2 is a side elevation of a part of a saw-plate having a recess for the introduction of a tooth and of the expansive fastener by means of which the tooth is held securely in its place. Fig. 3 is a side elevation of the expansive fastener removed from the saw-plate. Fig. 4 is a side elevation of a section of a saw-plate, and shows a tooth, shortened by wear, adjusted by means of sections of teeth or blocks. Fig. 5 is a side elevation of a section of a saw-plate with a tooth shortened by wear adjusted by means of blocks and rivets or a key, I, to prevent the teeth from being driven back, while the saw is in operation, or while the teeth are being swaged. Fig. 6 is a side elevation of a tooth removed from the saw-plate. Fig. 7 is side elevation of a section of a saw-plate, with the expansive fastener or key being turned back by my improved wrench adjusted therein for the purpose of removing or adjusting it and the teeth. Fig. 8 is a top or edge view of a section of a saw-plate having a tooth attached as I propose to attach them.

The letter A indicates a saw-blade; B, the saw-tooth; C D L, different parts of expansive fastener; F, a tapered slot extending from the outer edge of the fastener to an opening, F', approximating a circle in shape, and located near the lower edge of the fastener.

E is a grooved wedge, fitted to the tapering slot F, by means of which the fastener may be slightly expanded, the part L against the saw-tooth or the block G, and the part D against the tongue H of the saw-plate A. The opening F' allows the point of the wedge E to enter, and also permits the introduction of the wrench K, for purposes of adjustment, as shown in Fig. 7.

The point C' of the expansive fastener may be made a little larger than the radius of the curved recess of tooth B, and answers the purpose of a spring for securing the position of the tooth.

J is a curved recess in the saw-plate, to admit the removable tooth B.

I make the teeth in the form of a segment of a circle of any desired diameter, to be used in the construction of removable and adjustable saw-teeth, with or without tongues or grooves on one or both the front and back edge. The teeth made in this manner are securely held in their place in a saw-plate in any position to which they may be adjusted, to set them to the original gage after they have been sharpened.

Having described my invention, what I desire to secure by Letters Patent, and claim, is—

The segmental-shaped tooth B, the saw-plate A, having opening J, of a form to closely embrace the outer contour of the tooth, and provided with a tongue, H, the expansive fastener of shape approaching a complete circle, having a point, C, parts D L, partly separated by the tapered slot F, and circular opening, F', adapted to receive a wrench, K, in combination with wedge E, as shown and described, and for the purposes set forth.

GEORGE W. STINEBRING.

Witnesses:
J. EBERHART,
E. G. OLDROYD.